United States Patent
Dykema et al.

(10) Patent No.: US 10,467,162 B2
(45) Date of Patent: Nov. 5, 2019

(54) INTERRUPT BASED ON A LAST INTERRUPT REQUEST INDICATOR AND A WORK ACKNOWLEDGEMENT

(71) Applicant: HEWLETT PACKARD ENTERPRISE DEVELOPMENT LP, Houston, TX (US)

(72) Inventors: Gregory Lee Dykema, Fremont, CA (US); Joel Leon Lach, Fremont, CA (US); Michael T. Longenbach, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 181 days.

(21) Appl. No.: 15/475,394

(22) Filed: Mar. 31, 2017

(65) Prior Publication Data

US 2018/0285293 A1   Oct. 4, 2018

(51) Int. Cl.
*G06F 9/48* (2006.01)
*G06F 13/26* (2006.01)

(52) U.S. Cl.
CPC ............ *G06F 13/26* (2013.01); *G06F 9/4812* (2013.01)

(58) Field of Classification Search
CPC ................................ G06F 13/26; G06F 9/4812
USPC .......................................................... 710/267
See application file for complete search history.

(56) References Cited

U.S. PATENT DOCUMENTS

| | | |
|---|---|---|
| 6,185,639 B1 * | 2/2001 | Kailash .................. G06F 13/24 710/263 |
| 6,185,652 B1 | 2/2001 | Shek et al. |
| 6,219,727 B1 | 4/2001 | Kailash et al. |
| 6,237,058 B1 | 5/2001 | Nakagawa |
| 6,356,970 B1 | 3/2002 | Killian et al. |
| 6,529,986 B1 | 3/2003 | Chen et al. |
| 6,574,694 B1 | 6/2003 | Chen et al. |
| 6,889,278 B1 | 5/2005 | Hoerler et al. |
| 7,234,017 B2 | 6/2007 | Biran et al. |
| 7,243,178 B2 | 7/2007 | Munguia |
| 7,313,734 B2 | 12/2007 | Dewitt, Jr. et al. |
| 7,774,522 B2 | 8/2010 | Bouvier |
| 7,899,966 B2 | 3/2011 | Kulkarni |
| 7,953,906 B2 | 5/2011 | Zytaruk et al. |

(Continued)

OTHER PUBLICATIONS

Extended European Search Report received in EP Application No. 17208445.1 dated Jun. 26, 2018, 12 pages.

(Continued)

*Primary Examiner* — Christopher B Shin
(74) *Attorney, Agent, or Firm* — Hewlett Packard Enterprise Patent Department

(57) ABSTRACT

Examples include interrupting a processing resource based on a last interrupt request indicator and a work acknowledgement. Some examples include completion of work associated with a plurality of work units, storage of a last interrupt request indicator to specify a last completed work unit that includes a request to interrupt a processing resource, comparison of work unit information associated with the last interrupt request indicator with work unit information associated with a work acknowledgement generated by the processing resource, and interrupting the processing resource when the comparison indicates that the processing resource has not processed the completed work unit indicated by the last interrupt request indicator.

20 Claims, 4 Drawing Sheets

(56) References Cited

U.S. PATENT DOCUMENTS

| | | |
|---|---|---|
| 8,244,930 B1 | 8/2012 | Dykema et al. |
| 8,364,851 B2 | 1/2013 | Kessler et al. |
| 2007/0043970 A1* | 2/2007 | Solomita ............... G06F 9/4812 |
| | | 714/10 |
| 2014/0344492 A1 | 11/2014 | Patwa et al. |
| 2015/0347328 A1* | 12/2015 | Dominguez ............ G06F 13/24 |
| | | 710/267 |
| 2016/0179721 A1 | 6/2016 | Neiger et al. |
| 2018/0203812 A1* | 7/2018 | Park ........................ G06F 13/24 |

OTHER PUBLICATIONS

Coleman, J. "Reducing Interrupt Latency Through the Use of Message Signaled Interrupts," (Research Paper), Jan. 2009, 23 pages.

EventHelix.com Inc., "Direct Memory Access (DMA) and Interrupt Handling," Mar. 13, 2017, (Web Page), <http://www.eventhelix.com/RealtimeMantra/FaultHandling/dma_interrupt_handling.htm#.WMallW8rKUk>.

K. Kailash, "Apparatus and Method for Computer Host System and Adaptor Interrupt Reduction," U.S. Appl. No. 60/088,201, filed Jun. 5, 1998, (U.S. Pat. No. 6,185,639 dated Feb. 6, 2001).

PCI-SIG, "Message Signaled Interrupts," PCI Local Bus Specification, Revision 3.0, Section 6.8, Feb. 3, 2004, pp. 1-2, 231-253.

Rosa et al., "Problems to handle RS232 interrupts in CCS," Jan. 2013, (web page), <http://www.edaboard.com/thread277650.html>.

Wikipedia, "Direct memory access," Jan. 24, 2017, <https://en.wikipedia.org/w/index.php?title=Direct_memory_access&oldid=761715418>.

* cited by examiner

INTERRUPT BASED ON A LAST INTERRUPT REQUEST INDICATOR AND A WORK ACKNOWLEDGEMENT

BACKGROUND

In a computer system, a peripheral device may complete work tasks for a central processing unit (CPU) or other processing resource(s) of the computer system. Such work tasks may relate to computations offloaded from the CPU, or network packet transmission, for example. In some examples, the peripheral device may alert the CPU of completed work using interrupts.

BRIEF DESCRIPTION OF THE DRAWINGS

The following detailed description references the drawings, wherein.

DETAILED DESCRIPTION

As described above, a peripheral device to perform work tasks on behalf of a CPU (or other processing resource(s)) of a computer system may interrupt the CPU to notify it of completion of work tasks. However, interrupts provided too frequently may lead to an excessive amount of processing overhead for the CPU, which may be inefficient for the computer system, while delaying interrupts may increase latency for notifying the CPU of completed work tasks. Additionally, asynchronous communication between the CPU and a peripheral device to coordinate interrupts may lead to race conditions. For example, where new work tasks are completed in close proximity to the CPU finishing it's processing of all completed work tasks, depending on the order in which updates are made to indicate the CPU completion and the new work availability, the CPU may either be interrupted when there is no work to process (e.g., when the new work arrival is noted after the CPU has already processed it) or the CPU may miss a newly completed work unit (e.g., when new work is completed just before the CPU indicates that it has processed all work units).

To address these issues, examples described herein may utilize a last interrupt request indicator, a work acknowledgement, and an interrupt pending indicator to determine when computing circuitry is to interrupt a CPU (or other processing resource(s)) and when the computing circuitry is to refrain from interrupting the CPU. Such examples may beneficially balance the number of interrupts provided to the CPU to prevent the computing circuitry from providing an excessive number of interrupts, without introducing excessive latency from holding interrupts for too long. Such examples may also avoid race conditions based on usage of the last interrupt request indicator and the work acknowledgement.

For example, in examples described herein, a computing resource may include computing circuitry comprising logic executable to complete work associated with a plurality of work units made available to the computing circuitry. In some examples, the computing circuitry may store a last interrupt request indicator to specify a last completed work unit that includes a request to interrupt the processing resource. In such examples, in response to the processing resource clearing an interrupt pending indicator, the computing circuitry may compare work unit information associated with the last interrupt request indicator with work unit information associated with a work acknowledgement (generated by the processing resource to indicate at least one work unit that has been processed by the CPU after completion by the computing circuitry). In such examples, the computing circuitry may interrupt the processing resource when the comparison indicates that the processing resource has not processed at least the completed work unit indicated by the last interrupt request indicator.

Figure 1:
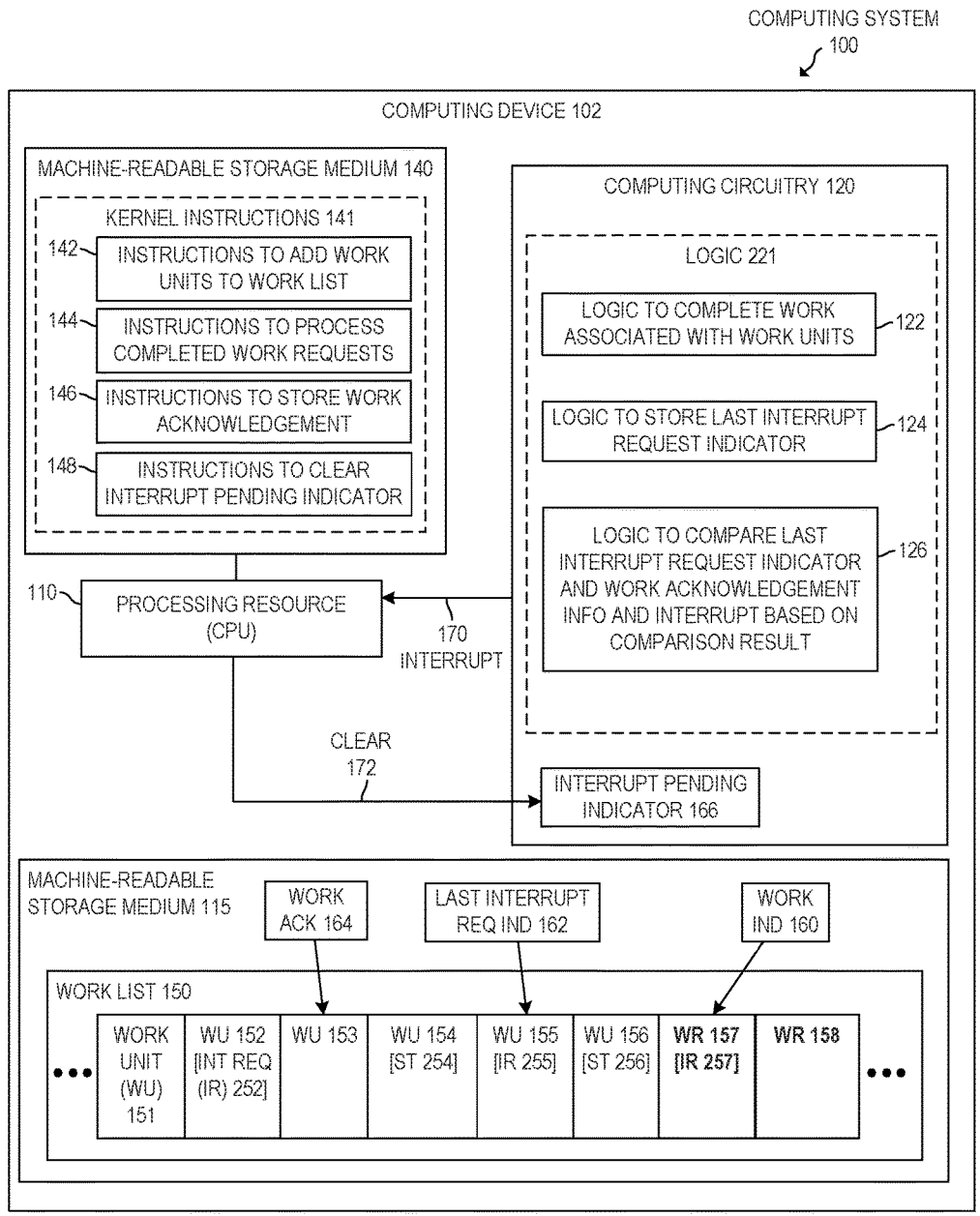
FIG. 1 is a block diagram of an example computing system including computing circuitry to compare work unit information associated with a last interrupt request indicator with work unit information associated with a work acknowledgement.

Referring now to the drawings, FIG. 1 is a block diagram of an example computing system 100 including computing circuitry 120 to compare work unit information associated with a last interrupt request indicator with work unit information associated with a work acknowledgement. In the example of FIG. 1, computing system 100 may comprise a computing device 102 including computing circuitry 120 and at least one processing resource 110, such as a CPU in some examples. In the example of FIG. 1, computing device 102 may also include a machine-readable storage medium 115 (e.g., memory) to store a work list 150 including a plurality of work units, such as work units 151-158, etc., illustrated in FIG. 1. While work units 151-158 are shown in FIG. 1 for illustrative purposes herein, work list 150 may include more, fewer, or different work units in different examples. In some examples, machine-readable storage medium 115 may be implemented by one or more machine-readable storage medium.

As used herein, a "computing device" may be a storage array, storage device, storage enclosure, server, desktop or laptop computer, switch, router, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

In examples described herein, computing circuitry 120 may be any suitable hardware or combination of hardware and programming to complete work units as described herein. In some examples, a computing resource may comprise computing circuitry 120. In examples described herein, a computing resource may be a computing device or a resource that may be included as a component of a computing device. For example, a computing resource herein may comprise an application-specific integrated circuit (ASIC) that comprises computing circuitry 120. In other examples, the computing resource may comprise a field-programmable gate array (FPGA) implementing computing circuitry 120. In other examples, the computing resource may comprise any other suitable implementation of computing circuitry 120. In some examples, the functionalities described herein in relation to logic 221 may be implemented by one or more engines which may be any combination of hardware and programming to implement the functionalities of the engine(s).

In examples described herein, computing circuitry 120 may execute logic 221 to perform the functionalities described herein in relation to computing circuitry 120. In some examples, the logic 221 may be implemented in hardware (e.g., in circuitry of an ASIC). In such examples, the logic 221 may be executed by the hardware to perform the functionalities described herein in relation to computing circuitry 120. In some examples, computing circuitry 120 may include logic 221 (e.g., the hardware to implement logic 221).

In other examples, computing circuitry 120 may be implemented in any suitable combination of hardware and programming (e.g., in circuitry of an ASIC). In examples described herein, such combinations of hardware and programming may be implemented in a number of different ways. For example, the programming for computing circuitry 120 may be processor executable instructions stored on at least one non-transitory machine-readable storage medium and the hardware for computing circuitry 120 may include processing resource(s) or other electronic circuitry to execute those instructions. In some examples, the hardware may also include other electronic circuitry to at least partially implement computing circuitry 120. In some examples, the at least one machine-readable storage medium may store instructions that, when executed by the at least one processing resource, at least partially implement some or all of logic 221. In such examples, a computing resource implementing computing circuitry 120 may include the at least one machine-readable storage medium storing the instructions and the processing resource(s) or other electronic circuitry to execute the instructions. In some examples, computing circuitry 120 may comprise the hardware to execute logic 221, as described above, while logic 221 is stored separate from but accessible to the hardware of computing circuitry 120.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As noted above, in the example of FIG. 1, storage medium 115 of computing device 102 may store a work list 150 including a plurality of work units, such as work units 151-158. In examples described herein, a work unit may be a collection of information to be operated on by computing circuitry prior to being processed by at least one processing resource (e.g., CPU) separate from the computing circuitry. For example, a work unit may be a collection of information that specifies work to be completed by the computing circuitry on behalf of the processing resource(s), wherein the processing resource(s) is to process the work unit after the computing circuitry has completed the work it specifies. In such examples, a work unit may be a control block, such as an XOR control block ("XCB"), a direct memory access (DMA) control block, or the like, for example. In other examples, work unit may be a network packet, as discussed in more detail below in relation to FIG. 2.

In the example of FIG. 1, processing resource(s) 110 may be implemented by a CPU 110, and CPU 110 may store work units 151-158 in work list 150 of storage medium 115. In such examples, work units 151-158 may be work units that specify work to be completed by computing circuitry 120 (e.g., control blocks or the like). Although examples are described below in relation to FIG. 1 in which processing resource(s) 110 is a CPU 110 and work units 151-158 are work units that specify work to be completed by computing circuitry, any suitable processing resource(s) 110 may be used in such examples, and work units 151-158 may be any suitable type of work unit as described herein in such examples.

In the example of FIG. 1, logic 221 may include at least one of logic 122, 124, and 126, or a combination thereof, and logic 221 may be executable by computing circuitry 120, as described above. In the example of FIG. 1, logic 122, when executed by computing circuitry 120, may complete work associated with the plurality of work units 151-158 made available to computing circuitry 120. In the example of FIG. 1, work units 151-158 may be made available to computing circuitry 120 by CPU 110 storing work units 151-158 in storage medium 115 (e.g., memory) accessible to both CPU 110 and computing circuitry 120. In such examples, as described above, each work unit may specify work to be completed by computing circuitry 120, such as performing computation(s), moving data, or the like. In such examples, the work units may include suitable information for computing circuitry 120 to perform the work specified by the work unit.

In some examples, as logic 122 completes work units, logic 124, when executed, may periodically store a current work indicator to indicate which work units computing circuitry 120 has completed. In examples in which the work units specify work to be completed by computing circuitry 120, a work unit is completed when the computing circuitry 120 has finished the work specified by the work unit. In some examples, work units may specify whether to store a current work indicator 160. For example, in the example of FIG. 1, work unit 154 may include data 254 indicating to store a current work indicator when computing circuitry 120 completes work unit 154, and work unit 156 may include data 256 indicating to store a current work indicator when computing circuitry 120 completes work unit 156. In such examples, when logic 122 completes work unit 154, logic 124 may determine from data 254 to store a current work indicator, and in response may store a work indicator indicating that work unit 154 is completed. As shown in the example of FIG. 1, when logic 122 completes work unit 156, logic 124 may determine from data 256 to store a current work indicator, and in response may store work indicator 160 indicating that work unit 156 is completed. For example, when work units are stored in an execution order (as described below), logic 124 may store work indicator 160 pointing to work unit 157 (e.g., the next work unit to be completed) to thereby indicate that those work units before work unit 157 in work list 150 (including work unit 156) are completed. In other examples, the work indicator may be stored (e.g., updated) after completion of each work unit.

In some examples, as logic 122 completes work units, logic 124, when executed, may periodically store a last interrupt request indicator to specify a last completed work unit that includes a request to interrupt CPU 110 (e.g., processing resource(s) 110) when completed. In some examples, some work units may include interrupt requests to request that computing circuitry 120 interrupt CPU 110 (e.g., processing resource(s) 110) when completed. For example, in the example of FIG. 1, work unit 152 may include an interrupt request 252 to request that computing circuitry 120 interrupt CPU 110 when work unit 152 is completed. Also in FIG. 1, work unit 155 may include an interrupt request 255, and work unit 157 may include an interrupt request 257. In examples described herein, to store a work indicator may include logic 124 may store a new work indicator or update a prior work indicator.

In such examples, when logic 122 completes work unit 152, logic 124 may determine from interrupt request 252 to store a last interrupt request indicator, and in response may store a last interrupt indicator to specify work unit 152 as the last completed work unit that includes a request to interrupt CPU 110. As shown in the example of FIG. 1, when logic 122 completes work unit 155, logic 124 may determine from interrupt request 256 to store a last interrupt request indicator, and in response may store a last interrupt indicator 162 to specify work unit 155 as the last completed work unit that includes a request to interrupt CPU 110. In some examples, when logic 124 determines that a completed work unit includes an interrupt request, as described above, logic 124 may store a current work indicator to indicate the work unit, in addition to storing the last interrupt request indicator, as described above. In some examples, any work unit having not having either data indicating to store a current work indicator or an interrupt request, computing circuitry 120 may not store or update a last interrupt request indicator or a work indicator after completion of the work indicator (but may proceed instead to completing a next work unit). In examples described herein, to store a last interrupt request indicator may include logic 124 may store a new work indicator or update a prior work indicator.

In the example of FIG. 1, work units may be stored in an order of execution (i.e., an "execution order") in a work list 150 implemented with any suitable data structure(s), such as circular buffer(s), queue(s), or the like. In such examples, logic 124 may store a work indicator comprising a pointer or other reference (e.g., memory address, a portion of a memory address, or the like) to the work unit, in work list 150, after the last work unit that was completed by computing circuitry 120 (e.g., a pointer or reference to the next work unit to be completed). In some examples, logic 124 may store a last interrupt request indicator comprising a pointer or other reference (e.g., memory address, a portion of a memory address, or the like) to the last completed work unit, in work list 150, that includes a request to interrupt CPU 110.

For example, at the moment illustrated in FIG. 1, logic 122 has completed work units 151-156, and work units 157 and 158 (illustrated in bold text) represent work units not yet completed by computing circuitry 120 at the moment illustrated in FIG. 1. In such examples, work indicator 160 may comprise a pointer or reference to work unit 157, indicating that those work units before it (i.e., at least work units 151-156) have been completed by computing circuitry 120. In the example of FIG. 1, last interrupt request indicator 162 may comprise a pointer or reference to work unit 155 (which is the last work unit completed by computing circuitry 120 that included an interrupt request). In some examples, CPU 110 may also store a work acknowledgement comprising a pointer or other reference (e.g., memory address, a portion of a memory address, or the like) to a work unit, as described below. Although work indicators, last interrupt request indicators, and work acknowledgements may be implemented as pointers or references in some examples, as described herein, work indicators, last interrupt request indicators, and work acknowledgements may be implemented differently in other examples.

In the example of FIG. 1, in response to logic 124 determining that a completed work unit (e.g. 155) includes an interrupt request (e.g., 255), logic 124 may further determine whether to interrupt CPU 110 in response to the interrupt request (in addition to storing a last interrupt request indicator, as described above). For example, logic 124 may access an interrupt pending indicator 166 to determine whether an interrupt of a particular type (e.g., an interrupt related to work list 150) is already pending with CPU 110. In some examples, interrupt pending indicator 166 may have a clear state indicating that no interrupt of the particular type is currently pending with CPU 110, or a pending state indicating that an interrupt of the particular type is currently pending with CPU 110. The pending state and the clear state may each be stored in any suitable manner using any suitable data (e.g., bit(s)), data structure, or the like.

In some examples, in response to logic 124 determining that a completed work unit (e.g. 155) includes an interrupt request (e.g., 255), logic 124 may further determine that interrupt pending indicator 166 has a clear state, indicating that no interrupt of the particular type is currently pending with CPU 110. In some examples, in response to the determination that interrupt pending indicator 166 has the clear state, logic 126 of computing circuitry 120 may interrupt 170 (e.g., provide an interrupt 170 to) CPU 110. In response, CPU 110 may process work units previously completed by computing circuitry 120, and may store a work acknowledgement to indicate at least one work unit, in work list 150, that has been processed by CPU 110 after completion by computing circuitry 120. For example, in the example of FIG. 1, CPU 110 may store work acknowledgement 164 indicating work unit 153 has been processed by CPU 110 after completion by computing circuitry 120. In the example of FIG. 1, where the work units are stored in execution or completion order, as described above, CPU 110 may store work acknowledgement 164 comprising a pointer or other reference (e.g., memory address, a portion of a memory address, or the like) to work unit 153 to indicate that work unit 153 and the work units preceding it (e.g., at least work units 151 and 152) have been processed by CPU 110 after completion by computing circuitry 120.

In some examples, in response to logic 124 determining that a completed work unit (e.g. 155) includes an interrupt request (e.g., 255), logic 124 may further determine that interrupt pending indicator 166 has the pending state, indicating that an interrupt of the particular type is currently pending with CPU 110. In such examples, in response to the determination that interrupt pending indicator 166 has the pending state, computing circuitry 120 may not interrupt CPU 110 based on the detected interrupt request (e.g., 255), and instead logic 124 may advance to completing the next work unit (e.g., work unit 156) without interrupting CPU 110 (e.g., before completing at least the next work unit in work list 150).

In such examples, at a later time, after CPU 110 has stored a work acknowledgement (e.g., 164), as described above, CPU 110 may further clear 172 the interrupt pending indicator 166 (i.e., set 172 the interrupt pending indicator 166 to the clear state). In such examples, in response to CPU 110 clearing the interrupt pending indicator 166, logic 126 may compare work unit information associated with the last interrupt request indicator with work unit information associated with a work acknowledgement generated by CPU 110. In such examples, logic 126 may interrupt 170 CPU 110 when the comparison indicates that CPU 110 has not processed at least the completed work unit indicated by the last interrupt request indicator. In examples described herein, the result of such as comparison may further indicate that processing resource(s) 110 (e.g., CPU 110) has not processed other completed work units, in addition to the given work unit indicated by the last interrupt indicator.

For example, in the example of FIG. 1, in which CPU 110 has generated and stored work acknowledgement 164, CPU 110 may clear 172 interrupt pending indicator 166 and, in response, logic 126 may compare work unit information associated with last interrupt indicator 162 with work unit information associated with work acknowledgement 164 and determine based on the comparison that CPU 110 has not processed at least the completed work unit indicated by last interrupt request indicator 162. For example, in the example of FIG. 1, work acknowledgement 164 indicates an earlier work unit 153 than last interrupt request indicator 162 (which indicates later work unit 155). In such examples, there is additional completed work for CPU 110 to process. In such examples, in response to the determination that CPU 110 has not processed at least the completed work unit 155 indicated by last interrupt request indicator 162, logic 126 may interrupt 170 CPU 110 to cause CPU 110 to process completed work units of work list 150.

In this manner, in examples described herein, computing circuitry 120 may not immediately provide an interrupt in response to each interrupt request, but may make a record (e.g., via the last interrupt request indicator) of a last completed work unit having an interrupt request, which may be used subsequently to determine whether to provide an interrupt based on that interrupt request at a later time. In examples described herein, computing circuitry 120 may reduce the number of interrupts provided to processing resource(s) (e.g., a CPU) while still alerting the processing to completed work unit ready for processing by the processing resource(s). For example, rather than providing an interrupt to the processing resource(s) for each completed work unit that includes an interrupt request, in examples described herein, the computing circuitry may continually update a last interrupt request indicator to maintain a record of at least the last work unit completed by the computing circuitry that includes an interrupt request. In such examples, the computing circuitry may process a few (e.g., 5, 10, etc.) or many (e.g., 50, 100, or more, etc.) work units including interrupt requests without interrupting CPU, but while updating the last interrupt request indicator. In such examples, when the interrupt pending indicator associated with one or more work list(s) including the work units being processed by computing circuitry 120 is updated to a clear state, the computing circuitry may determine whether to provide an interrupt based in part on the current last interrupt request indicator, as described above, such that an interrupt may be provided to the processing resource(s) based on the work unit indicated by the last interrupt request indicator when that work unit has not been processed, and without having to provide an interrupt for every work unit including an interrupt request (and potentially without having to provide any further interrupts if the work request indicated by the last interrupt request indicator has already been processed by the processing resource(s)).

The example of FIG. 1 will now be described in some further detail below. In the example of FIG. 1, computing device 102 may include a machine-readable storage medium 140 to store instructions executable by CPU 110 (or processing resource(s) 110). In some examples, CPU 110 or processing resource(s) 110 may at least partially execute an operating system (OS) of computing device 102. For example, in the example of FIG. 1, storage medium 140 may include kernel instructions 141, including at least instructions 142, 144, 146, and 148. In some examples, kernel instructions 141 may be part of a kernel of an OS of computing device 102 and, when executed, may at least service or interact with computing circuitry 120.

In examples described herein, processing resource(s) 110 (e.g., CPU 110) may fetch, decode, and execute instructions stored on storage medium 140 to perform the functionalities described above in relation to instructions stored on storage medium 140. In other examples, the functionalities of any of the instructions of storage medium 140 may be implemented in the form of electronic circuitry, in the form of executable instructions encoded on a machine-readable storage medium, or a combination thereof. In some examples, machine-readable storage medium 115 may be implemented by one or more machine-readable storage medium. In other examples, the functionalities described above in relation to instructions of medium 140 may be implemented by one or more engines which may be any combination of hardware and programming to implement the functionalities of the engine(s). In some examples, storage medium 140 and storage medium 115 may be different, separate machine-readable storage media. In other examples, the same at least one machine-readable storage medium may implement both storage medium 115 and storage medium 140.

In the example of FIG. 1, CPU 110 may execute instructions 142 to add work units 151-158 to work list 150 stored in memory of computing device 102 (e.g., storage medium 115). As described above, in some examples, the work units may specify work to be completed by computing circuitry 120, some work units may include interrupt requests (e.g., work units 152, 155, and 157), and some work units may include data indicating to store a work indicator (e.g., work units 154 and 156).

In such examples, computing circuitry 120 may comprise logic 122 executable to complete work associated with the work units 151-158 made available to computing circuitry 120 by CPU 110 storing them in work list 150 on storage medium 115, which is accessible to computing circuitry 120. In such examples, logic 122 may access work list 150 in storage medium 115. In such examples, for each of a plurality of work units in work list 150, logic 122 may complete (e.g., perform) the work specified in the work unit. For example, logic 122 may complete (e.g., perform) specified work such as computation operation(s) specified in the work units, data movement operation(s) specified in the work units, or any other suitable work or operation(s) that may be specified in the work units (e.g., work to be performed by a DMA engine of the computing circuitry 120, for example).

In such examples, for each given work unit of the plurality of work units 151-158, in work list 150, after completion of the given work unit by logic 122, logic 124 may identify whether the given work unit includes data indicating to store a current work indicator when computing circuitry 120 completes the given work unit, and if so, logic 124 in response may store a work indicator indicating at least that the given work unit is completed, as described above. In some examples, the work indicator may indicate that the given work unit, and those before it (in the execution order) in work list 150, have been completed by computing circuitry 120. In some examples, logic 124 may store a work indicator to any suitable location of computing device 102 that is accessible to computing circuitry 120 and CPU 110. For example, logic 124 may store the work indicator to memory of the CPU (e.g., to storage medium 115 in some examples, as shown in FIG. 1), to a register of computing circuitry 120, or both. When logic 124 identifies that the given work unit does not include the data indicating to store the work indicator, logic 124 may not store the work indicator to indicate the given work unit (e.g., unless the work unit includes an interrupt request, for example).

In the example of FIG. 1, for each given work unit of the plurality of work units 151-158, in work list 150, after completion of the given work unit by logic 122, logic 124 may identify whether the given work unit includes an interrupt request. In response to an identification that the given work unit includes an interrupt request, logic 124 of computing circuitry 120 may store a work indicator to indicate that at least the given work unit in work list 150 has been completed by the computing circuitry, may store a last interrupt request indicator to specify the given work unit as a last completed work unit, in work list 150, that includes a request to interrupt CPU 110, and may determine whether an interrupt pending indicator for the work list has a pending state.

For example, after logic 122 completes performance of the work specified by work unit 155, for example, logic 124 may identify that work unit 155 includes an interrupt request 155. In response, logic 124 may store the work indicator to indicate at least the given work unit, as described above. Also in response to the identification, logic 124 may store a last interrupt request indicator 162 indicating work unit 155, as described above. In some examples, logic 124 may store a last interrupt request indicator to any suitable location of computing device 102 that is accessible to computing circuitry 120 and CPU 110. For example, logic 124 may store a last interrupt request indicator to memory of the CPU (e.g., to storage medium 115 in some examples, as shown in FIG. 1), to a register of computing circuitry 120, or both.

Also in response to the identification, logic 124 may access an interrupt pending indicator 166 associated with work list 150 to determine whether the interrupt pending indicator 166 associated with (or "for") work list 150 has a pending state or a clear state. In examples described herein, an interrupt pending indicator may be stored in any suitable location of computing device 102 that is accessible to computing circuitry 120 and CPU 110. For example, interrupt pending indicator 166 may be stored in memory of the CPU (e.g., to storage medium 115 in some examples), to a register of computing circuitry 120 (as shown in FIG. 1), or both. In examples described herein, an interrupt pending indicator may be an indicator associated with a particular type of interrupt, such as, for example, interrupts generated based on the completion of work specified (e.g., work unit(s)) in a particular work list or a particular group of work lists. For example, in the example of FIG. 1, interrupt pending indicator 166 may indicate whether an interrupt associated with work list 150 (i.e., generated based on work unit(s) of work list 150) is pending.

In the example of FIG. 1, in response to a determination that interrupt pending indicator 166 has the clear state (i.e., there is no interrupt associated with work list 150 currently pending with CPU 110), logic 126 may interrupt 170 CPU 110 (e.g., provide an interrupt to CPU 110), and logic 126 may set interrupt pending indicator 166 to indicate that an interrupt related to the work list is currently pending (e.g., set interrupt pending indicator 166 to the pending state).

In the example of FIG. 1, in response to a determination that interrupt pending indicator 166 has the pending state, logic 122 may complete work associated with a next work unit (after the given work unit) in work list 150, without interrupting CPU 110 before completing the work associated with at least the next work unit in work list 150. In such examples, logic 221 may not interrupt CPU 110 in response to the completion of a work unit including an interrupt request based on interrupt pending indicator 166 having the pending state (although an interrupt may be provided at a later time). In such examples, logic 221 may not interrupt CPU 110 as a direct result of the presence of the interrupt request in the given work unit.

In response to being interrupted by computing circuitry 120 with an interrupt of a type associated with work list 150, CPU 110 may execute instructions 144 to process work units (of work list 150) completed by computing circuitry 120. In examples described herein, to process a work unit completed by computing circuitry 120, processing resource(s) 110 (e.g., CPU 110) may perform action(s) related to the work specified in the work unit, and the action(s) performed may vary depending on the work specified. For example, when the work specified in a given work unit relates to computing circuitry 120 moving data from one location to another, processing resource(s) 110 (e.g., CPU 110) may process the completed work unit by freeing (e.g., for re-use) the source location that computing circuitry 120 moved the data from in completing the work specified by the given work unit. As another example, when the work specified in a given work unit relates to computing circuitry 120 performing computation(s) on data or otherwise generating a data result, processing resource(s) 110 (e.g., CPU 110) may process the completed work unit by taking action(s) related to the data result (e.g., the result of the computation(s)), such as accessing the data result, using the data result (e.g., in a further computation, action, etc.), scheduling the data result to be provided to another location, or the like. In other examples, any other suitable action(s) related to the work specified in a work unit may be performed to process the completed work unit.

In the example of FIG. 1, CPU 110 may execute instructions 146 to store a work acknowledgement to indicate at least one work unit, in work list 150, that has been processed by the CPU after being completed by computing circuitry 120. For example, after instructions 144 process work unit 153 of work list 150, instructions 146 may generate and store a work acknowledgement 164 indicating at least work unit 153, as described above. In some examples, instructions 146 may store a work acknowledgement to any suitable location of computing device 102 that is accessible to computing circuitry 120 and CPU 110. For example, instructions 146 may store the work indicator to memory of the CPU (e.g., to storage medium 115 in some examples, as shown in FIG. 1), to a register of computing circuitry 120, or both. In some examples, storing the work acknowledgement may be performed in an atomic operation, such as a single write operation to write the entire work acknowledgement.

In some examples, after instructions 146 store the work acknowledgement, CPU 110 may execute instructions 148 to update 172 the interrupt pending indicator 166 to indicate that no interrupt related to the work list is currently pending with the CPU by setting the interrupt pending indicator 166 to the clear state (which may be referred to herein as "clearing" the interrupt pending indicator). In such examples, logic 126 may access interrupt pending indicator 166 and determine that interrupt pending indicator 166 has been cleared (i.e., set to the clear state). In response to CPU 110 clearing interrupt pending indicator 166 (e.g., in response to the determination that interrupt pending indicator 166 has been cleared, logic 126 of computing circuitry 120 may compare work unit information associated with the last interrupt request indicator with work unit information associated with the work acknowledgement. In such examples, logic 126 may interrupt 170 CPU 110 when the comparison (i.e., the result of the comparison) indicates that CPU 110 has not processed at least the given work unit indicated by the last interrupt request indicator.

For example, the work unit information associated with a last interrupt request indicator may comprise information representing a work unit indicated by the last interrupt request indicator, such as an identifier (e.g., value, etc.) assigned to (or otherwise associated with or identifying) at least one work unit identified by the last interrupt request indicator. For example, the work unit information associated with a last interrupt request indicator may comprise a memory address or a portion of a memory address at which a work unit indicated by the last interrupt request indicator is stored. In such examples, the last interrupt request indicator may comprise the memory address (or portion thereof). Similarly, the work unit information associated with a work acknowledgement may comprise information representing a work unit indicated by the work acknowledgement, such as an identifier (e.g., value, etc.) assigned to (or otherwise associated with or identifying) at least one work unit identified by the work acknowledgement. For example, the work unit information associated with a work acknowledgement may comprise a memory address or a portion of a memory address at which a work unit indicated by the work acknowledgement is stored. In such examples, the work acknowledgement may comprise the memory address (or portion thereof).

In the example of FIG. 1, for example, in which the work list 150 includes the work units in execution order, as described above, work unit information associated with the last interrupt request indicator may comprise a value indicating the relative position, in work list 150, of a work unit indicated by the last interrupt request indicator. In such examples, work unit information associated with the work acknowledgement may comprise a value indicating the relative position, in work list 150, of a work unit indicated by the work acknowledgement. In such examples, logic 126 may perform the comparison by comparing the value associated with the work unit indicated by the last interrupt request indicator 162 with the value associated with the work unit indicated by the work acknowledgement 164 (e.g., to determine whether the CPU 110 has processed at least the work unit indicated by the last interrupt request indicator). For example, in examples in which the work unit information comprises full or partial memory addresses of work units, as described above, logic 126 may perform the comparison by comparing the full or partial memory address of the last interrupt request indicator 162 with the full or partial memory address of the work acknowledgement 164 to determine whether the CPU 110 has processed at least the work unit indicated by the last interrupt request indicator. In examples in which a circular buffer (or the like) is utilized to store the work units, logic 126 may, in the comparison of the full or partial memory addresses, account for any wrapping of the circular buffer that may occur.

In such examples, in response to CPU 110 clearing interrupt pending indicator 166, logic 126 may access work unit information associated with last interrupt request indicator 162 (e.g., a value associated with the work unit 155 indicated by last interrupt request indicator 162), may access work unit information associated with work acknowledgement 164 (e.g., a value associated with the work unit 153 indicated by last interrupt request indicator 153), and may compare the accessed work unit information, as described herein. In such examples, based on the result of the comparison, logic 126 may determine whether CPU 110 has processed the completed work unit 155 indicated by last interrupt request indicator 162.

For example, logic 126 may compare the values (e.g., address portions) to determine whether the work unit indicated by the last interrupt request indicator 162 is later in the work list 150 than the work unit indicated by the work acknowledgement 164 (e.g., accounting for any wrapping in the implementation of the work list 150). For example, logic 126 may determine whether the value (e.g., address portion) associated with the last interrupt request indicator 162 is greater than the value (e.g., address portion) associated with the work acknowledgement 164 (e.g., while accounting for any wrapping in circular work list implementations). In the example of FIG. 1, logic 126 may, for example, compare a portion of a memory address for work unit 155 (associated with the last interrupt request indicator 162) with a portion of a memory address for work unit 153 (associated with the work acknowledgement 164), and the result of the comparison may indicate that work unit 155 indicated by last interrupt request indicator 162 is later in work list 150 than work unit 153 indicated by work acknowledgement 164. In such examples, logic 126 may determine, based on the result of the comparison, that CPU 110 has not processed at least the completed work unit 155 indicated by the last interrupt request indicator 162. In such examples, in response to that determination, logic 126 may interrupt 170 CPU 110. In other examples, such as where the last interrupt request indicator and the work acknowledgement indicate the same work unit, the work unit information (e.g., values) associated with the last interrupt request indicator and the work acknowledgement may be the same (e.g., the same address portions), indicating that CPU 110 has processed the completed work unit indicated by the last interrupt request indicator. In such examples, logic 126 may refrain from providing an interrupt 170 to CPU 110.

In other examples, logic 126 may implement the comparison in any other suitable manner to determine whether the work unit indicated by the last interrupt request indicator has been processed by the CPU 110. For example, logic 126 may compare the values described above to determine whether the values are equal, and when they are not, determine that CPU 110 has not processed at least the work unit indicated by the last interrupt request indicator, and interrupt 170 CPU 110. In other examples, information associated with a pointer of the last interrupt request indicator may be compared with information associated with a pointer of the work acknowledgement last interrupt request indicator in a suitable manner to determine whether CPU 110 has processed the work unit indicated by the last interrupt request indicator.

In other examples, such as when the last interrupt request indicator and the work acknowledgement are implemented in a different manner, logic 126 may perform the comparison in a different manner. For example, in other examples, the last interrupt request indicator may comprise information to indicate each of the plurality of work units (e.g., of work list 150) that has been completed by CPU 110 and that includes a request to interrupt CPU 110. In such examples, the last interrupt request indicator may include this information in any suitable form, format, data structure, etc. For example, the last interrupt request indicator may include a series of bits (e.g., a bitmask) in which each bit position represents one of the work units of work list 150, and the value of the bit at that position indicates whether the corresponding work unit includes an interrupt request. In such examples, logic 124 may store the last interrupt request indicator, as described above, by updating the last interrupt request indicator with an appropriate bit to indicate that a work unit completed by computing circuitry 120 includes an interrupt request (e.g., by setting a bit representing the completed work unit to "1" to indicate the interrupt request).

In such examples, the work acknowledgement may comprise information to indicate each of the plurality of work units (e.g., of work list 150) that have been processed by CPU 110 after completion by computing circuitry 120. In such examples, the work acknowledgement may include this information in any suitable form, format, data structure, etc., as described above in relation to the last interrupt request indicator. For example, the work acknowledgement may include a series of bits (e.g., a bitmask) in which each bit position represents one of the work units of work list 150, and the value of the bit at that position indicates whether the corresponding work unit has been processed by CPU 110 after completion by computing circuitry 120. In such examples, instructions 146, when executed by CPU 110, may store the work acknowledgement by storing or updating the series of bits with appropriate bit values to indicate the work unit(s) processed by CPU 110 (e.g., by setting each bit representing work unit processed by CPU 110 to "1" to indicate that it has been processed).

In such examples, the work unit information associated with the last interrupt request indicator may comprise the series of bits of the last interrupt request indicator, as described above, and the work unit information associated with the work acknowledgement may comprise the series of bits of the work acknowledgement, as described above. In such examples, to determine whether CPU 110 has processed the completed a work unit indicated by the last interrupt request indicator, logic 126 may compare the series of bits of the last interrupt request indicator to the series of bits of the work acknowledgement. In such examples, when the comparison result indicates that at least one completed work unit indicated by the last interrupt request indicator as including an interrupt request has not been processed by CPU 110, as indicated by the work acknowledgement, then logic 126 may interrupt 170 CPU 110 in response.

For example, the last interrupt request indicator may include a "1" for each completed work unit including an interrupt request, and the work acknowledgement may include a "1" for each completed work unit processed by CPU 110. In such examples, logic 126 may perform a bitwise comparison (e.g., a bitwise logical "AND") of the bits of the last interrupt request indicator with the bits of the work acknowledgement, and may determine that CPU 110 has not processed at least a completed a work unit including an interrupt request, when the last interrupt request indicator includes a "1" at a bit position where the work acknowledgement does not have a "1".

In examples in which the last interrupt request indicator and the work acknowledgement include associated work information as a series of bits, as described above, the work indicator may also include work unit information as a series of bits, where each bit position represents a work unit (e.g., of work list 150), and the value of the bit indicates whether the work unit has been completed by computing circuitry 120. In such examples, the work list 150 may be maintained in an order different than the execution order.

Although examples have been described above in relation to a single work list 150, in other examples, computing circuitry 120 may complete work associated with work units from multiple different work lists of computing device 102. In such examples, CPU 110 (executing instructions 142) may add work units to each of the work lists (e.g., in storage medium 115). In such examples, logic 221 may store work indicators and last interrupt request indicators, as described above, but in such examples, logic 221 may store a separate work indicator for each of the work lists (e.g., based on the interrupt requests and other data of the work units in each respective work list) and may store a separate last interrupt request indicator for each of the work lists (e.g., based on interrupt requests in the work units of each respective work list). In some examples, computing circuitry 120 may complete work associated with work units from a single work list at a time. In other examples, computing circuitry 120 may complete work associated with work units from different work lists in parallel.

In such examples, CPU 110 (executing instructions 146) may store a separate work acknowledgement for each of the work lists, respectively, with each work acknowledgement indicating the work units processed by CPU 110 in a respective one of the work lists. In such examples, each of the work lists may have a respective interrupt pending indicator, which may have a pending state when an interrupt related to or associated with the respective work list is pending and which may have a clear state when an interrupt related to or associated with the respective work list is not pending. In such examples, one interrupt may be provided at a time for each of the respective work lists.

In such examples, in response to CPU 110 clearing an interrupt pending indicator for a respective one of the work lists, logic 126 may, compare work unit information associated with the last interrupt request indicator for the respective work list with work unit information associated with a work acknowledgement for the respective work list. In such examples, logic 126 may interrupt 170 the processing resource (e.g., provide an interrupt associated with the respective work list) when the result of the comparison indicates that CPU 110 has not processed at least the completed work unit indicated by the last interrupt request indicator for the work list. In such examples, when the result of the comparison indicates that CPU 110 has processed the completed work units indicated by the last interrupt request indicator for the respective work list, then computing circuitry 120 may proceed to completing work associated with other work unit(s) without interrupting CPU 110 based on the comparison. In some examples, functionalities described herein in relation to FIG. 1 may be provided in combination with functionalities described herein in relation to any of FIGS. 2-4.

Figure 2:
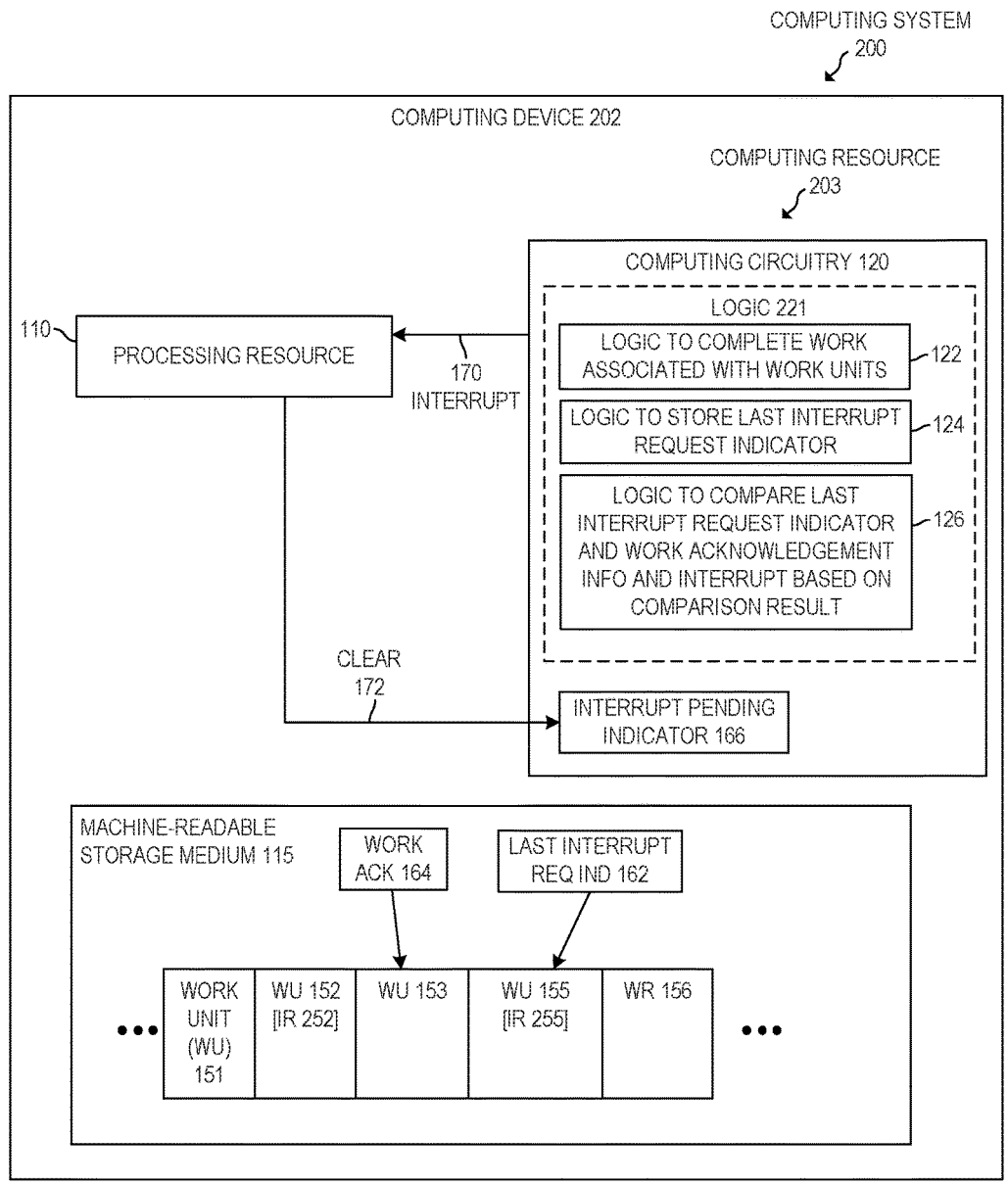
FIG. 2 is a block diagram of an example computing system including a computing resource comprising computing circuitry to interrupt a processing resource based on a comparison of work unit information associated with a last interrupt request indicator with work unit information associated with a work acknowledgement.

FIG. 2 is a block diagram of an example computing system 200 including a computing resource 203 comprising computing circuitry 120 to interrupt a processing resource 110 based on a comparison of work unit information associated with a last interrupt request indicator with work unit information associated with a work acknowledgement. In the example of FIG. 2, computing system 200 includes a computing device 202. Computing device 202 comprises at least one processing resource 110 (as described above in relation to FIG. 1), a machine-readable storage medium 115 to store work units (as described above in relation to FIG. 1), and a computing resource 203 separate from processing resource(s) 110. In the example of FIG. 2, computing resource 203 may comprise computing circuitry 120, as described above in relation to FIG. 1. In some examples, computing circuitry 120 may comprise logic 221, which may be implemented as described above in relation to FIG. 1.

In the example of FIG. 2, logic 221 may include logic 122 executable by computing circuitry 120 to complete work associated with a plurality of work units made available to computing circuitry 120. In some examples, logic 122 may access at least work units 151, 152, 153, 155, and 156, made available to computing circuitry 120 in storage medium 115, as described above in FIG. 1. Logic 122 may complete work associated with the plurality of work units as described above in relation to FIG. 1.

In some examples, logic 221 may include logic 124 executable by computing circuitry 120 to store a last interrupt request indicator (e.g., 162) to specify a last completed work unit (e.g., 155) that includes a request to interrupt a processing resource (e.g., 255), as described above in relation to FIG. 1. In some examples, logic 221 may include logic 126 to compare work unit information associated with the last interrupt request indicator to work unit information associated with a work acknowledgement generated by processing resource(s) 110, as described above, in response to processing resource(s) 110 clearing an interrupt pending indicator 166. In some examples, the interrupt pending indicator 166 may store a clear state or a pending state, as described above in relation to FIG. 1. In such examples, logic 126 may interrupt 170 processing resource(s) 110 when the comparison indicates that processing resource(s) 110 have not processed at least a completed work unit indicated by the last interrupt request indicator.

In the example of FIG. 2, the last interrupt request indicator and the work acknowledgement may be implemented in any suitable manner, as described above in relation to FIG. 1. In some examples, the last interrupt request indicator and the work acknowledgement may comprise respective pointers to work units and logic 126 may compare the work unit information associated with them, as described above in relation to FIG. 1. In other examples, the last interrupt request indicator and the work acknowledgement may each comprise a respective series of bits and logic 126 may compare the respective series of bits, as described above in relation to FIG. 1.

As described above in relation to FIG. 1, in some examples, work units may specify work to be completed by computing circuitry 120 on behalf of processing resource(s) 110. In such examples, work units may be generated by processing resource 110 and may be made available to computing circuitry 120 by processing resource(s) 110 storing respective work units in storage medium 115 in a region accessible to computing circuitry 120.

In other examples, each of the plurality of work units may be a respective network packet acquired by computing circuitry 120. For example, computing device 202 may include at least one network interface able to communicate via at least one computer network such as, for example, a local area network (LAN), a virtual LAN (VLAN), a wireless local area network (WLAN), a virtual private network (VPN), the Internet, or the like, or a combination thereof. In such examples, computing circuitry 120 may acquire each of the network packets via the network interface. In such examples, to complete work associated with the network packets (i.e., work units), logic 122 of computing circuitry may store the network packets in memory of computing device 202 (e.g., machine-readable storage medium 115). In some examples, metadata of network packets may specify work to be done for the packet. In such examples, for computing circuitry 120 to complete work associated with such a network packet, logic 122 may store the network packet in memory of computing device 202, complete the work specified in the metadata of the network packet, or both.

In some examples, some of the network packets may include respective interrupt requests, as described above in relation to work units. In such examples, logic 124 may store a last interrupt request indicator, as described above, to specify a last stored network packet (i.e., completed work unit) that includes a request to interrupt processing resource(s) 110. In such examples, in response to an interrupt from computing circuitry 120, processing resource(s) 110 may process the stored network packets (i.e., completed work units) by performing suitable action(s) based on the network packets stored in the memory by computing circuitry 120. For example, processing resource(s) 110 may perform any action(s) specified by the network packet, such as obtaining data requested by the network packet, adding a payload of the network packet to other received data, or the like, or a combination thereof. In such examples, processing resource(s) 110 may store a work acknowledgement (e.g., 164), as described above, to indicate which network packets (i.e., work units) it has processed. While processing resource(s) 110 are processing the network packets in response to an interrupt associated with the network packets, the interrupt pending indicator 166 may have the pending state.

In response to the processing resource clearing interrupt pending indicator 166, as described above, logic 126 of computing circuitry 120 may compare work unit information associated with the last interrupt request indicator with work unit information associated with the work acknowledgement, in a suitable manner as described above. In such examples, logic 126 may interrupt processing resource(s) 110 when the comparison indicates that processing resource(s) 110 have not processed at least a stored network packet (i.e., a completed work unit) indicated by the last interrupt request indicator (as a network packet including an interrupt request). In some examples, functionalities described herein in relation to FIG. 2 may be provided in combination with functionalities described herein in relation to any of FIGS. 1 and 3-4.

Figure 3:
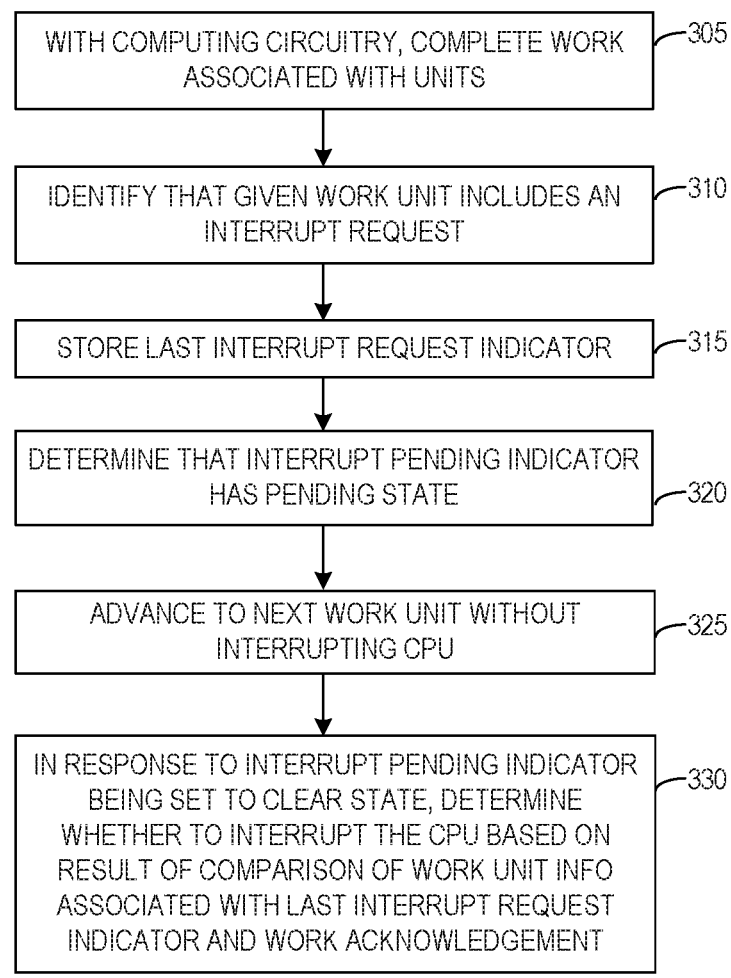
FIG. 3 is a flowchart of an example method of a computing system including storing a last interrupt request indicator.

FIG. 3 is a flowchart of an example method 300 of a computing system including storing a last interrupt request indicator. Although execution of method 300 is described below with reference to computing system 100 of FIG. 1, other suitable systems for the execution of method 300 may be utilized (e.g., computing system 200 of FIG. 2). Additionally, implementation of method 300 is not limited to such examples.

In the example of FIG. 3, at 305 of method 300 computing circuitry 120 (separate from a CPU 110 of a computing device 102) may complete work specified by work units in a work list 150 stored in memory (e.g., storage medium 115) of computing device 102, as described above in relation to FIG. 1. At 310, computing circuitry 120 may identify that a given one of the work units, that computing circuitry 120 has completed, includes an interrupt request, as described above. At 315, in response to identifying that the given completed work unit includes an interrupt request, computing circuitry 120 may store a last interrupt request indicator to specify the given work unit as a last completed work unit including a request to interrupt CPU 110.

At 320, computing circuitry 120 may determine that an interrupt pending indicator 166 for work list 150 has a pending state, which indicates that an interrupt related to work list 150 is currently pending with CPU 110, as described above. At 325, in response to determining that the interrupt pending indicator has the pending state, computing circuitry 120 may advance to a next work unit of work list 150 without interrupting CPU 110, as described above.

At 330, in response to CPU 110 setting the interrupt pending indicator to a clear state, computing circuitry 120 may determine whether to interrupt CPU 110 based on a comparison of work unit information associated with the last interrupt request indicator with work unit information associated with a work acknowledgement of CPU 110, as described above. In such examples, the result of the comparison may indicate whether CPU 110 has processed the given work unit completed by the computing circuitry and indicated by the last interrupt request indicator, as described above in relation to FIG. 1. In examples described herein, functionalities described as performed by computing circuitry 120 may be performed by computing circuitry 120 executing logic 221, as described above.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
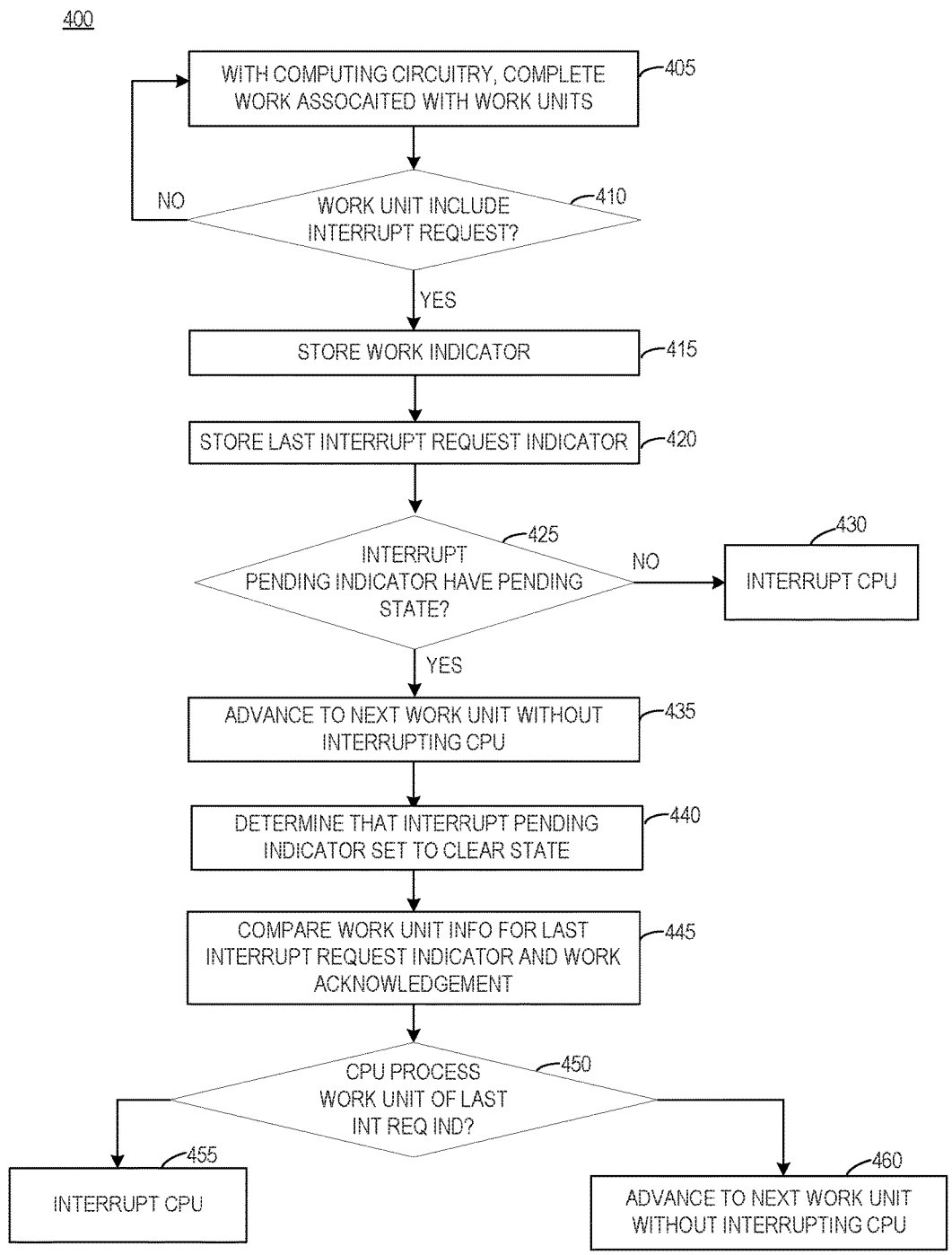
FIG. 4 is a flowchart of an example method of a computing system including determining whether to interrupt a CPU based on a comparison of work unit information associated with a last interrupt request indicator with work unit information associated with a work acknowledgement.

FIG. 4 is a flowchart of an example method 400 of a computing system including determining whether to interrupt a CPU based on a comparison of work unit information associated with a last interrupt request indicator with work unit information associated with a work acknowledgement. Although execution of method 400 is described below with reference to computing system 100 of FIG. 1, other suitable systems for the execution of method 400 may be utilized (e.g., computing system 200 of FIG. 2). Additionally, implementation of method 400 is not limited to such examples.

In the example of FIG. 4, at 405 of method 400 computing circuitry 120 (separate from a CPU 110 of a computing device 102) may complete work specified by work units in a work list 150 stored in memory (e.g., storage medium 115) of computing device 102, as described above in relation to FIG. 1.

At 410, computing circuitry 120 may identify whether a given one of the work units, that computing circuitry 120 has completed, includes an interrupt request, as described above. If not, then method 400 may return to 405 where computing circuitry 120 may complete work specified by a next work unit of work list 150. If a given one of the completed work units includes an interrupt request, then in response computing circuitry 120 may store a work indicator to indicate that at least the given work unit in work list 150 has been completed by computing circuitry 120, as described above. Also in response to identifying that the given completed work unit includes an interrupt request, at 420, computing circuitry 120 may store a last interrupt request indicator to specify the given work unit as a last completed work unit including a request to interrupt CPU 110, as described above.

At 425, computing circuitry 120 may determine whether an interrupt pending indicator 166 for work list 150 has a pending state. If not (e.g., if computing circuitry 120 determine that interrupt pending indicator 166 has the clear state, indicating that no interrupt related to work list 150 is currently pending with CPU 110), then at 430 computing circuitry 120 may interrupt CPU 110 and may set the interrupt pending indicator 166 to the pending state. If, at 425, computing circuitry 120 determines that interrupt pending indicator 166 has the pending state, indicating that an interrupt related to work list 150 is currently pending with CPU 110, then at 435 computing circuitry 120 may advance to a next work unit of work list 150 without interrupting CPU 110, as described above.

At 440, computing circuitry 120 may determine that interrupt pending indicator 166 has been set to the clear state (e.g., by CPU 110). At 445, in response to CPU 110 setting interrupt pending indicator 166 to the clear state, computing circuitry 120 may compare work unit information associated with the last interrupt request indicator with work unit information associated with a work acknowledgement stored by CPU 110, as described above.

At 450, based on the result of the comparison, computing circuitry 120 may determine whether CPU 110 has processed the given work unit completed by the computing circuitry and indicated by the last interrupt request indicator, as described above in relation to FIG. 1. When computing circuitry 120 determines that the result of the comparison indicates that CPU 110 has not processed at least the given work unit completed by computing circuitry 120 and indicated by the last interrupt request indicator, at 455 computing circuitry 120 may interrupt CPU 110 and set the interrupt pending indicator 166 to the pending state. When computing circuitry 120 determines that the result of the comparison indicates that CPU 110 has processed the given work unit completed by computing circuitry 120 and indicated by the last interrupt request indicator, at 460 computing circuitry 120 may advance to a next work unit of work list 150 without interrupting CPU 110.

In examples described herein, functionalities described as performed by computing circuitry 120 may be performed by computing circuitry 120 executing logic 221, as described above. Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A computing resource comprising:
   computing circuitry comprising logic executable to:
   perform tasks specified by information of a plurality of work units stored in a storage medium, accessible to the computing circuitry and to a processor, wherein each work unit is to be processed by the processor after the task specified by the work unit is performed by the computing circuitry;
   store, in the storage medium, a first reference to identify a given one of the plurality of work units as a work unit specifying the task most recently performed by the computing circuitry among the work units, of the plurality of work units, that include a respective request to interrupt the processor, wherein the processor is to store in the storage medium a second reference to indicate a given work unit that has been processed by the processor after the task specified by the given work unit is performed by the computing circuitry;

in response to the processor clearing an indication that an interrupt is pending for the processor, compare information associated with the first reference with information associated with the second reference; and interrupt the processor when the comparison indicates that the processor has not processed the work unit identified by the first reference.

2. The computing resource of claim 1, wherein the logic of the computing circuitry is executable to:

when the comparison indicates that the processor has processed the work unit indicated by the first reference, perform the task specified by a next work unit of the plurality of work units without interrupting the processor before performing the task specified by the next work unit.

3. The computing resource of claim 1, wherein the logic of the computing circuitry is executable to:

after performance of a task specified by a particular one of the work units, identify whether the particular work unit includes a request to interrupt the processor, wherein the work units are stored in a work list on the storage medium, the work list associated with an interrupt pending indicator; and in response to an identification that the particular work unit includes a request to interrupt the processor, determine whether the interrupt pending indicator associated with the work list has a pending state.

4. The computing resource of claim 3, wherein the logic of the computing circuitry is executable to:

in response to the identification that the particular work unit includes a request to interrupt the processing resource:

store, in the storage medium, a third reference to indicate that at least the task specified by the particular work unit has been performed by the computing circuitry, wherein the third reference is a work indicator; and store the first reference to specify the particular work unit, wherein the first reference is a last interrupt request indicator; and in response to a determination that the interrupt pending indicator has the pending state, perform the task specified by a next work unit of the plurality of work units without interrupting the processor before performing the task specified by the next work unit.

5. The computing resource of claim 3, wherein the logic of the computing circuitry is executable to:

in response to the identification that the particular work unit includes a request to interrupt the processing resource:

store, in the storage medium, a third reference to indicate that at least the task specified by the particular work unit has been performed by the computing circuitry, wherein the third reference is a work indicator; and store the first reference to specify the particular work unit, wherein the first reference is a last interrupt request indicator; and in response to a determination that the interrupt pending indicator has a clear state:

interrupt the processing resource; and set the interrupt pending indicator to a pending state to indicate that an interrupt is currently pending.

6. The computing resource of claim 1, wherein the computing resource is an application-specific integrated circuit (ASIC) comprising the logic in hardware.

7. The computing resource of claim 3, wherein:

the work units are stored in the work list in an execution order;

the first reference is a last interrupt request indicator comprising a pointer to the work unit specifying the task that was last performed by the computing circuitry among the work units in the work list that include a request to interrupt the processor; and the second reference is a work acknowledgement comprising a pointer to the work unit that was last processed by the processor among the work units in the work list that specify tasks that have been performed by the computing circuitry.

8. The computing resource of claim 1, wherein:

the first reference indicates each of the plurality of work units that specifies a task that has been performed by the computing circuitry and that includes a request to interrupt the processor, wherein the first reference is a last interrupt request indicator; and the second reference indicates each of the plurality of work units that has been processed by the processor after performance of its specified task by the computing circuitry, wherein the second reference is a work acknowledgement.

9. A computer system comprising:

memory to store a work list data structure;

computing circuitry to access the memory; and a central processing unit (CPU) to access the memory and to execute instructions to store a plurality of work units in the work list, wherein each of the work units includes information specifying a respective task to be performed by the computing circuitry and for the CPU, wherein the CPU is to process each work unit after the task it specifies is performed by the computing circuitry;

wherein, after the performance of a task specified by the information of a given work unit of the plurality of work units, the computing circuitry is to determine whether a request to interrupt the CPU is included in the information of the given work unit;

wherein, in response to a determination that the information of the given work unit includes a request to interrupt the CPU, the computing circuitry is to store a first reference to identify the given work unit as a work unit specifying the task most recently performed by the computing circuitry, among the work units in the work list that include a request to interrupt the CPU;

wherein the CPU is to execute instructions to process the work units performed by the computing circuitry and store a second reference to identify one of the work units, in the work list, that has been processed by the CPU after the task it specifies has been performed by the computing circuitry; and wherein, in response to the CPU clearing an indication that an interrupt is pending for the CPU, the computing circuitry is to interrupt the CPU when the second reference indicates that the CPU has not processed the given work unit identified by the first reference.

10. The computer system of claim 9, wherein:
in response to the determination that the information of the given work unit includes a request to interrupt the CPU, the computing circuitry is further to:
store, in the memory, a third reference to indicate that at least the task specified by the given work unit in the work list has been performed by the computing circuitry, wherein the third reference is a work indicator; and
determine, from the interrupt pending indicator, whether an interrupt associated with the work list is currently pending for the CPU,
wherein the clearing the indication that an interrupt is pending for the CPU comprises setting an interrupt pending indicator associated with the work list to a clear state.

11. The computer system of claim 10, wherein, in response to a determination that an interrupt associated with the work list is currently pending for the CPU, the computing circuitry is to:
perform a task specified by a next work unit in the work list without interrupting the CPU before performing the task specified by the next work unit.

12. The computer system of claim 10, wherein, in response to a determination, based on the interrupt pending indicator, that an interrupt associated with the work list is not currently pending, the computing circuitry is to:
interrupt the CPU; and
set the interrupt pending indicator to a pending state to indicate that an interrupt associated with the work list is currently pending for the CPU.

13. The computer system of claim 9, wherein:
the CPU is to execute instructions to, after storing the second reference, update an interrupt pending indicator to a clear state to indicate that no interrupt associated with the work list is currently pending with the CPU, wherein the second reference is a work acknowledgement and the first reference is a last interrupt request indicator.

14. The computer system of claim 9, wherein:
in response to the CPU clearing the indication that an interrupt is pending for the CPU, the computing circuitry is to perform the task specified by a next work unit in the work list without interrupting the CPU before performing the task specified by the next work unit, when the second reference indicates that the CPU has processed the given work unit identified by the first reference.

15. A method comprising:
with computing circuitry of a computing device, perform tasks specified by information of a plurality of work units in a work list stored in memory of the computing device, wherein each work unit is to be processed by the CPU after the task specified by the work unit is performed by the computing circuitry, and wherein the work list is associated with an interrupt pending indicator to indicate whether an interrupt related to the work list is currently pending with the CPU;
with the computing circuitry, identifying that a given one of the work units, specifying a task that has been performed by the computing circuitry, includes an interrupt request;
with the computing circuitry, in response to identifying that the given one of the work units includes an interrupt request, storing, in the memory, a first reference to identify the given work unit as a work unit specifying the task that was last performed by the computing circuitry, among the work units in the work list that include a request to interrupt the CPU;
with the computing circuitry, determining that the interrupt pending indicator for the work list has a pending state that indicates that an interrupt related to the work list is currently pending with the CPU;
with the computing circuitry, in response to determining that the interrupt pending indicator has the pending state, advancing to a next work unit of the work list without interrupting the CPU; and
in response to the CPU setting the interrupt pending indicator to a clear state that indicates that an interrupt related to the work list is not currently pending with the CPU, determining, with the computing circuitry and based on the second reference, whether the CPU has processed the given work unit performed by the computing circuitry and identified by the first reference; and
determining whether to interrupt the CPU based on the determination of whether the CPU has processed the given work unit performed by the computing circuitry and identified by the first reference.

16. The method of claim 15, further comprising:
in response to the CPU setting the interrupt pending indicator to the clear state:
with the computing circuitry, comparing information associated with the first reference with information associated with the second reference, wherein the first reference is a last interrupt request indicator and the second reference is a work acknowledgement to indicate at least one work unit, in the work list, that has been processed by the CPU after performance of the task it specifies by the computing circuitry.

17. The method of claim 16, further comprising:
with the computing circuitry, interrupting the CPU in response to a determination that the CPU has not processed the given work unit specifying a task performed by the computing circuitry and identified by the first reference.

18. The method of claim 17, further comprising:
with the computing circuitry, advancing to a next work unit of the work list without interrupting the CPU in response to a determination that the CPU has processed the given work unit specifying a task performed by the computing circuitry and identified by the first reference.

19. The method of claim 15, further comprising:
in response to identifying that the given work unit includes an interrupt request, storing, with the computing circuitry, a third reference to indicate that at least the task specified by the given work unit has been performed by the computing circuitry, wherein the third reference is a work indicator.

20. The computing resource of claim 1, wherein the computing circuitry comprises a combination of hardware and programming to implement the logic.

* * * * *